(12) United States Patent
McKean et al.

(10) Patent No.: US 6,950,900 B1
(45) Date of Patent: Sep. 27, 2005

(54) METHOD AND APPARATUS FOR MIGRATING DATA HAVING A FORMAT OF A FIRST TYPE TO A FORMAT OF A SECOND TYPE

(75) Inventors: Brian Dennis McKean, Longmont, CO (US); Noel S. Otterness, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 09/671,002

(22) Filed: Sep. 27, 2000

(51) Int. Cl.⁷ .............................................. G06F 12/00
(52) U.S. Cl. ......................................... 711/114; 711/4
(58) Field of Search ..................................... 711/114, 4

(56) References Cited

U.S. PATENT DOCUMENTS

| | | | |
|---|---|---|---|
| 4,788,685 A | | 11/1988 | Sako et al. |
| 4,819,236 A | | 4/1989 | Sako et al. |
| 4,881,232 A | | 11/1989 | Sako et al. |
| 4,907,215 A | | 3/1990 | Sako et al. |
| 5,388,013 A | * | 2/1995 | Nakamura ................ 360/48 |
| 5,523,903 A | | 6/1996 | Hetzler et al. |
| 5,574,851 A | * | 11/1996 | Rathunde ................ 711/114 |
| 5,822,142 A | | 10/1998 | Hicken |
| 5,875,456 A | * | 2/1999 | Stallmo et al. .......... 711/114 |
| 5,887,199 A | * | 3/1999 | Ofer et al. ................. 710/65 |
| 5,889,934 A | | 3/1999 | Peterson |
| 6,008,960 A | | 12/1999 | Belser |
| 6,058,489 A | * | 5/2000 | Schultz et al. .............. 714/7 |

* cited by examiner

*Primary Examiner*—Mano Padmanabhan
*Assistant Examiner*—Paul A Baker
(74) *Attorney, Agent, or Firm*—Crawford Maunu PLLC

(57) ABSTRACT

A method and apparatus that moves data stored in a first (e.g., 512) byte sector format to a second (e.g., 52x) byte sector size. The method and apparatus performs data migration without interruption of the host's ability to write and read data from the system. By migrating data to a number of new drives added to the system drive, the additional data which will be stored may be accommodated. The added drives allow the migration to take place without interruption of the hosts I/O path or allows the data to be migrated to an entirely new set of physical drives. The present invention also provides the ability to migrate data between sector sizes and still protect against component failures. The migration is performed in such a way that if a controller fails while performing the migration the survivor controller will be able to pick up where the failed controller left off. This is done through checkpoints in the migration process and saving information to a non-volatile memory which allows for resumption of the migration process.

25 Claims, 5 Drawing Sheets

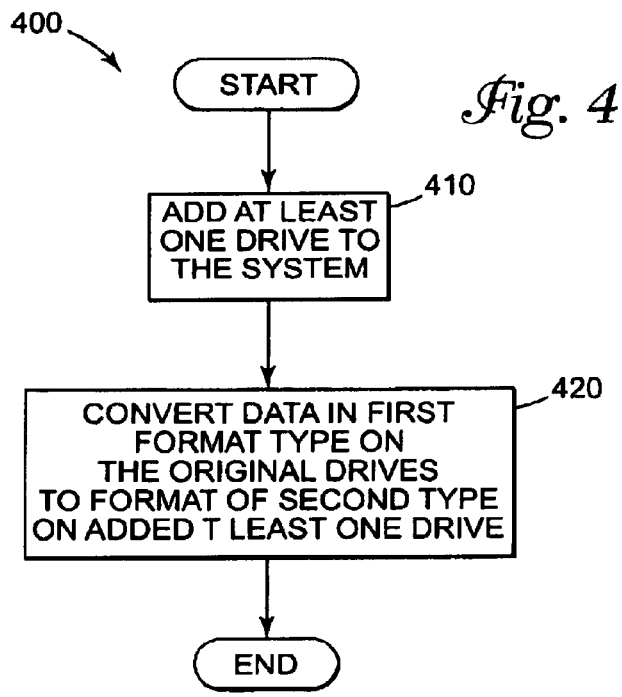
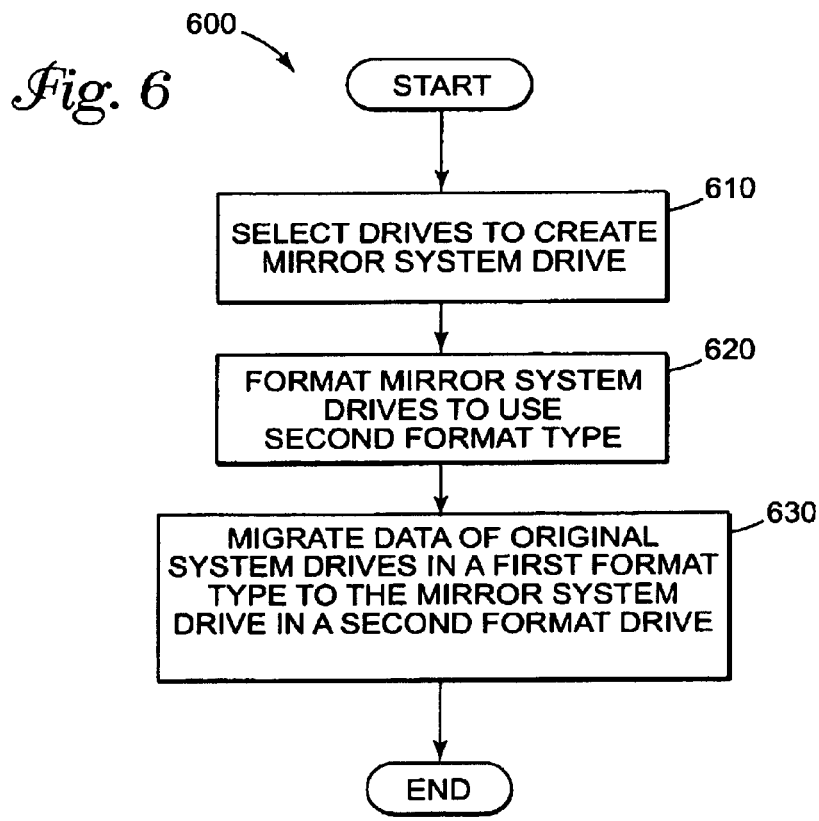

METHOD AND APPARATUS FOR MIGRATING DATA HAVING A FORMAT OF A FIRST TYPE TO A FORMAT OF A SECOND TYPE

BACKGROUND OF THE INVENTION

1. Field of the Invention

This invention relates in general to mass storage systems, and more particularly to a method and apparatus for migrating data having a format of a first type to a format of a second type.

2. Description of Related Art

Direct access storage devices (DASDs) are used to store data for host data processing systems. One often used type of DASD is a magnetic disk unit including a number of disks or platters having surfaces with magnetic active material onto which data is written and from which data is read by magnetic read/write heads. In other types of DASDs, optical or other data storage media may be employed.

In a magnetic disk unit, the disks are formatted to define sectors and tracks upon the disk surfaces. Tracks are usually circular regions coaxial with the disk axis where data may be written, and sectors are parts of the tracks capable of storing a predetermined quantity of data written to the disk. Axially aligned tracks on the disks of a DASD are referred to as cylinders. The sectors of a DASD where blocks of data are stored have unique physical data block addresses (DBA), which may be expressed in cylinder, head, record (CHR) notation, relative block address (RBA) notation or in some other way. The disks of the DASD spin in unison around a common axis, and the read/write heads, usually one for each surface, are moved radially in unison across the disk surfaces. When data is read from or written to a physical DBA, the heads are moved into alignment with the cylinder containing the track in which the DBA is found, and the data transfer takes place as the sector or sectors of the DBA spin under the head.

Important considerations in the design and use of DASDs are capacity, speed of data transfer and reliability. For reasons including those discussed in Patterson et al., "A Case for Redundant Arrays of Inexpensive Disks (RAID)", ACM SIGMOD Conference, Chicago, Ill., Jun. 1–3, 1980, increasing performance levels attained by central processing units (CPUs) and system memory in data processing systems result in the need for larger and faster data storage systems. To achieve these goals of capacity and speed, it has been proposed to use arrays containing a number of DASDs rather than a single very large and expensive DASD for data storage.

To meet the growing requirements of today's computer systems, and simultaneously, to achieve flexibility and reliability in the function and configuration of a mass storage system, manufacturers of such systems have needed to make their systems adaptable to differing host standards. However, it would be desirable to manufacture the same mass storage system for use with the differing standards associated with various host computer manufacturers.

One particular area in which the standards have clearly not been consistent is the data block structure with which a host computer system formats its data. Thus, in an IBM AS/400 system, each block has 520 bytes of data. Other system configurations, such as those using the Unix operating system, require 512 bytes of data per block (the defacto standard). In addition, there can be one or more bytes of error correcting code or parity as required by the host system.

In modern high speed, high capacity systems, the host system does not perform the actual storage of the data on or in the mass storage device. This is left to a sophisticated storage controller which receives the blocks of data and formats them for storage in view of the physical characteristics of a disk drive.

As mentioned above, currently external controllers use a 512 byte sector size on the backing storage disks. However, manufacturers are moving to larger sector sizes to accommodate first sector and system drive information and later full LRC information. However, a problem with migrating a system drive which fully utilizes the available space on the drives which it is built with is that there is no room to allow for a larger sector size. To allow the migration to take place a number of new drives must be added to the system drive to accommodate the additional data which will be is stored.

It can be seen then that there is a need for a method and apparatus that moves data stored in a first (e.g., 512) byte sector format to a second (e.g., 52x) byte sector size.

It can also be seen that there is a need for a method and apparatus that performs data migration without interruption of the host's ability to write and read data from the system.

SUMMARY OF THE INVENTION

To overcome the limitations in the prior art described above, and to overcome other limitations that will become apparent upon reading and understanding the present specification, the present invention discloses a method and apparatus for migrating data having a format of a first type to a format of a second type.

The present invention solves the above-described problems by migrating data to a number of new drives added to the system drive to accommodate the additional data which will be stored. The added drives allow the migration to take place without interruption of the hosts I/O path or allows the data to be migrated to an entirely new set of physical drives.

A method in accordance with the principles of the present invention includes a adding at least one drive to a system controller controlling a predetermined number of storage devices arranged in a digital array storage devices to form a system drive and converting data in a first format type on the digital array of storage devices to a format of a second type on the added at least one drive.

Other embodiments of a method in accordance with the principles of the invention may include alternative or optional additional aspects. One such aspect of the present invention is that the adding at least one drive further includes formatting a first drive in the second format type and adding the first drive formatted in the second format type to the system drive of the system controller.

Another aspect of the present invention is that the converting further includes relaying out data stored on the predetermined number of storage devices arranged in the digital array storage devices forming the system drive using the predetermined number of storage devices and the added first drive formatted in the second format type, adding second drive formatted in the second format type to the system controller and migrating data of first format type from one of the predetermined number of storage devices to the added second drive in the second format type.

Another aspect of the present invention is that the migrating is performed by the system controller using a background process.

Another aspect of the present invention is that the system controller performs data writes to both the one of the predetermined number of storage devices and the added second drive during the migration performed by the background process.

Another aspect of the present invention is that the one of the predetermined number of storage devices is removed after the migration is completed, an additional drive formatted in the second format type is added in its place and data of the first format type from another of the predetermined number of storage devices is migrated to the additional drive in the second format type.

Another aspect of the present invention is that the migrating is performed by the system controller using a regeneration function when the one of the predetermined number of storage devices fails before the migration has completed.

Another aspect of the present invention is that the converting further includes relaying out data stored on the predetermined number of storage devices arranged in the digital array of storage devices forming the system drive using the predetermined number of storage devices and the added first drive formatted in the second format type, removing one of the predetermined number of storage devices arranged in the digital array of storage devices forming the system drive, reformatting the removed storage device to the second format type, reinstalling the reformatted storage device and rebuilding data in the first format type onto the reinstalled storage device in the second format type using a regeneration function.

Another aspect of the present invention is that the adding at least one drive to a system controller further includes selecting drives to create a mirror system drive and formatting the mirror system drive using the second format type.

Another aspect of the present invention is that the converting data further includes copying data from the predetermined number of storage devices arranged in the digital array storage devices in the first format type to the mirror system drive in the second format type.

Another aspect of the present invention is that the system controller performs data writes to both the system drive and the mirror system drive during the copying of the data to the mirror system drive.

Another aspect of the present invention is that the system drive is removed after completion of the copying process.

Another aspect of the present invention is that the first format type is 512 bytes per sector and the second format type consists of one selected from the group including 520 bytes per sector, 524 bytes per sector and 528 bytes per sector.

In another embodiment of the present invention, a storage system is provided. The storage system includes a plurality of storage devices forming a system drive, the plurality of storage devices formatted in a first format type, a system controller, coupled to the plurality of storage devices, for controlling the plurality of storage devices forming the system drive, and at least one additional drive formatted in a second format type, coupled to the system controller, wherein the system controller converts data in a first format type on the plurality of storage devices to a format of a second type on the at least one additional drive.

Another aspect of the present invention is that the at least one drive further includes a first drive formatted in the second format type.

Another aspect of the present invention is that the system controller converts data in a first format type on the plurality of storage devices to a format of a second type on the first drive formatted in the second format type by re-laying out data stored on the plurality of storage devices and the added first drive formatted in the second format type, adding a second drive formatted in the second format type to the system controller; and migrating data of first format type from one of the plurality of storage devices to the added second drive in the second format type.

Another aspect of the present invention is that the migrating is performed by the system controller using a background process.

Another aspect of the present invention is that the system controller performs data writes to both the one of the plurality of storage devices and the added second drive during the migration performed by the background process.

Another aspect of the present invention is that the one of the plurality of storage devices is removed after the migration is completed, an additional drive formatted in the second format type is added in its place and data of the first format type from another of the plurality of storage devices is migrated to the additional drive in the second format type.

Another aspect of the present invention is that the migrating is performed by the system controller using a regeneration function when the one of plurality of storage devices fails before the migration has completed.

Another aspect of the present invention is that the system controller converts data in a first format type on the plurality of storage devices to a format of a second type on the first drive formatted in the second format type by re-laying out data stored on the predetermined number of storage devices arranged in the digital array of storage devices forming the system drive using the predetermined number of storage devices and the added first drive formatted in the second format type, removing one of the predetermined number of storage devices arranged in the digital array of storage devices forming the system drive, reformatting the removed storage device to the second format type, reinstalling the reformatted storage device and rebuilding data in the first format type onto the reinstalled storage device in the second format type using a regeneration function.

Another aspect of the present invention is that the at least one drive further includes a plurality of additional storage devices arranged to form a mirror system drive, wherein the plurality of additional storage devices arranged to form the mirror system drive are formatted using the second format type.

Another aspect of the present invention is that the system controller converts data by copying data from the plurality of storage devices in the first format type to the mirror system drive formatted in the second format type.

Another aspect of the present invention is that the system controller performs data writes to both the system drive and the mirror system drive during the copying of the data to the mirror system drive.

Another aspect of the present invention is that the plurality of storage devices forming the system drive are removed after completion of the copying process to the mirror drive.

Another aspect of the present invention is that the first format type is 512 bytes per sector and the second format type consists of one selected from the group including 520 bytes per sector, 524 bytes per sector and 528 bytes per sector.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 illustrates a flow chart of a general embodiment of the invention for migrating data from a first format type to a second format type;

FIG. 6 illustrates the preferred method of the present invention for migrating data from a first format type to a second format type.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus that moves data stored in a first (e.g., 512) byte sector format to a second (e.g., 52x which will be used to refer to, for example, 520/524/528) byte sector size. The method and apparatus performs data migration without interruption of the host's ability to write and read datarom the system. By migrating data to a number of new drives added to the system drive, the additional data which will be stored may be accommodated. The added drives allow the migration to take place without interruption of the hosts I/O path or allows the data to be migrated to an entirely new set of physical drives.

Figure 1:
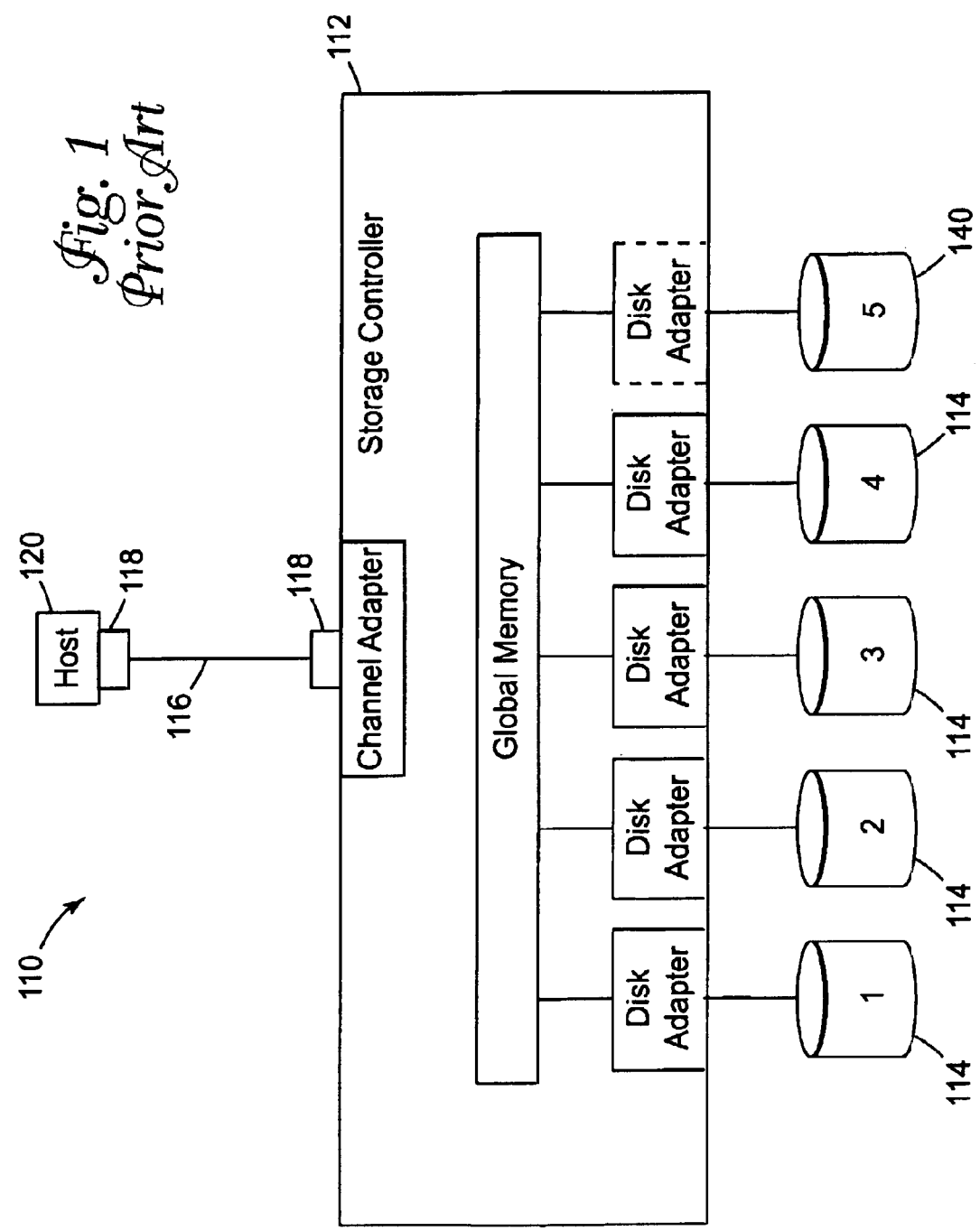
FIG. 1 illustrates a storage system for a typical mass storage configuration having a storage controller connecting to a plurality of disk drive elements.

FIG. 1 illustrates a storage system 110 for a typical mass storage configuration having a storage controller 112 connecting to a plurality of disk drive elements 114. The disk drive elements are collectively controlled by the storage controller, and may be of any size, however for certain configurations it is preferred that the drives be of a similar size.

The storage controller 112 connects over a communications path 116, connected through terminator elements 118, to a host computer 120. The communications path can be for example a SCSI bus and the host computer 120 can be a server, a main frame computer, or a work station having a display and keyboard.

The disk drives 114, while being characterized as having a so-called capacity in terms of the number of bytes each can store, are divided both physically and logically into a plurality of elements. Logically, these elements, called logical volumes, may be split by the storage controller across a number of disk drives, as is used in some forms of RAID, or one or more logical volumes can be found on a single disk drive element 114. The interconnection and access which a host has to a logical volume is set by the storage controller 112.

As noted above, different host computers, depending upon their manufacturer, operate in accordance with different protocols. In particular, when writing to a mass storage device, the host computer will block the data, however, the size of the blocks will vary depending upon both the particular protocol being used and the manufacturer. For example, an IBM based system such as the AS/400 will block the data into blocks of 520 bytes. Other systems such as those using a Unix operating system operate according to what is generally considered the standard block size of 512 bytes. In addition, each of the blocks has an appropriate number, typically 8, of error correcting bytes within which are stored, for example, parity and error correcting code values. The disk drive elements 114, on the other hand, are today typically physically configured to "expect" a data block size of 512 bytes.

As will be described in more detail with reference to FIGS. 3–6, data is migrated from a first format type to a second format type by adding at least one drive 140, either as an additional drive or a mirror system. Then, the data in a first format type on the original drives 114 is converted to a format of second type on the added at least one drive 140.

Figure 2:
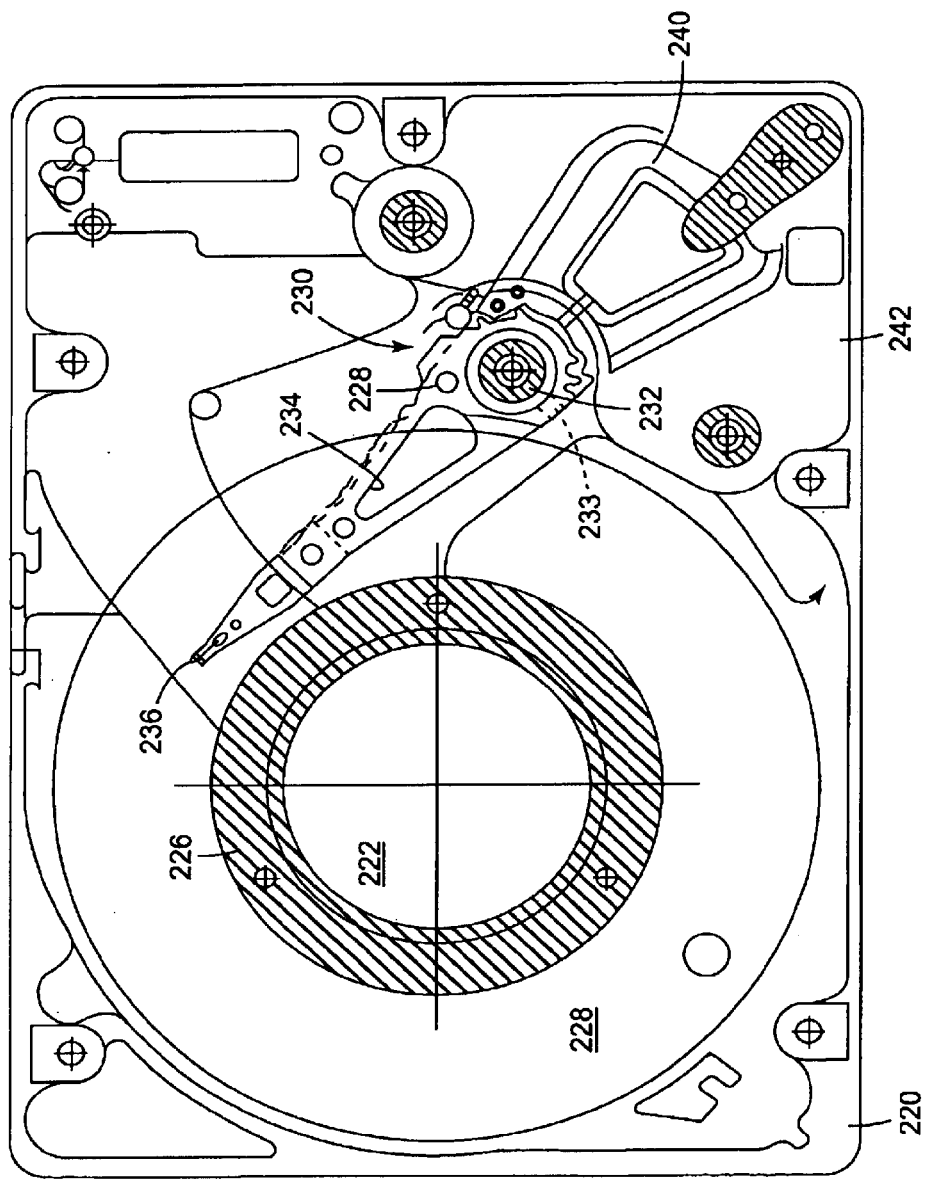
FIG. 2 illustrates the principal electrical and mechanical components of a disk drive.

Referring to FIG. 2, the principal electrical and mechanical components of a disk drive constructed are illustrated. The disk drive includes a head/disk assembly (HDA) 220 which includes a base 222 and a cover (not shown). Attached to the base 222 is a spindle with an attached hub 226. Attached to the spindle with an attached hub 226 is at least one disk 228. Also attached to the base is a spindle motor for rotating the spindle with an attached hub 226 and the disk 228. Spindle motor driver circuitry controls the current passing through the spindle motor to produce a torque and controllably rotate the hub and disk 228 attached to the spindle.

An actuator assembly 230 is also attached to the base 222. The actuator assembly 230 shown is a rotary type actuator and is provided with a pivot apparatus 232, such as a bearing cartridge, to allow smooth rotation of the actuator assembly. The actuator assembly 230 includes a body 233 having arms 234 on one end. The arms 234 carry transducers 236 in transducing relation to the disk 228. A load beam or suspension 235 is attached each arm. The transducers 236 are attached to each load beam or suspension 235. The transducers 236 are encapsulated within a slider or small ceramic block. The slider carries the transducer over the disk. The other end of the actuator body 233 includes a portion of an actuator motor. The portion of the actuator motor shown attached to the actuator body 233 is the coil 240. An other portion of the actuator motor is attached to the base 222. The other portion shown in FIG. 2 is a magnetic field apparatus 242. The coil 240 and the magnetic field apparatus 242 form a voice coil motor used to move the actuator body and reposition one or more sliders which carry the transducers 236, also commonly referred to as read/write heads, to different radial positions relative to one or more surfaces of the disk 228. The pivot apparatus 232, such as a precision bearing cartridge, allows for a smooth rotational movement of the actuator assembly 230.

Figure 3:
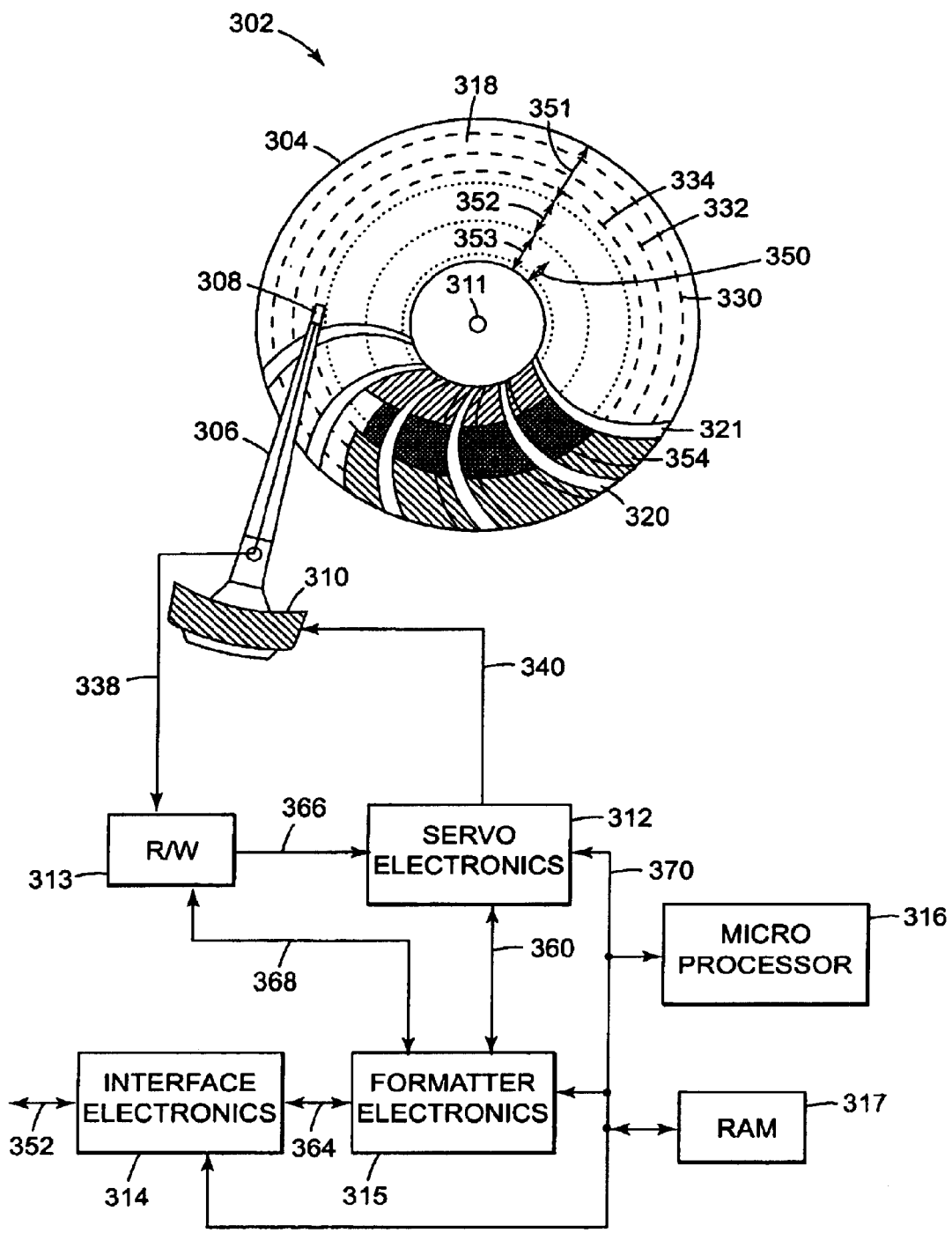
FIG. 3 illustrates the formatting of a disk drive according to the present invention.

FIG. 3 illustrates the formatting of a disk drive according to the present invention. As shown in FIG. 3, the disk drive is formatted using a fixed block architecture with sector servo and zone-bit recording. However, those skilled in the art will recognize that the present invention is not meant to be limited to the specific formatting illustrated in FIG. 3. Rather, the formatting is present for as one example of formatting of a disk drive for better understanding of the issue involved with migrating data from a first format type to a second format type. The disk drive, designated generally as 302, includes data recording disk 304, actuator arm 306, data recording transducer 308 (also called a recording head), voice coil motor 310, servo electronics 312, read/write electronics 313, interface electronics 314, formatter electronics 315, microprocessor 316 and RAM 317. Data recording disk 304 includes center of rotation 311, and is divided for head positioning purposes into a set of radially spaced tracks, one of which is shown at 318. The tracks are grouped radially into a number of zones, four of which are shown as 350, 351, 352 and 353. Zone 350 is a reserve area zone where certain critical information such as tables and indices needed to convert logical block addresses to physical locations, are stored. The tracks are also grouped radially into a plurality of sparing partitions, three of which are shown as 330, 332, and 334. Each sparing partition includes a selected number of tracks and includes a number of desired spare sectors. As shown, the sparing partitions are groups of tracks which are smaller than the zones 351, 352 and 353 in which customer data is stored. It should be noted, that this does not necessarily have to be the case. The sparing partitions could be larger than the zones if so desired. The sparing partitions contain a selected number of spare sectors within each sparing partition. The sparing partitions are generally invisible and therefore the boundaries are shown as dashed lines. The disk contains a plurality of servo sectors 320, which extend across the tracks in a generally radial direction. Each track has a reference index 321. Within each zone, the tracks are also circumferentially divided into a number of data sectors 354. As will be discussed hereafter, the data sectors contain no sector ID fields. In accordance with the normal meaning of "fixed block architecture", all data sectors are substantially the same size, expressed in bytes of data. Different sector sizes may easily be adapted to tolerate some variation in data sector size, such as from 512 bytes per sector to 520 bytes per sector, in the event a customer desires or requires a different sector size. The number of data sectors per track varies from zone to zone, and some of the data sectors do not begin immediately following a servo sector. Further, some of the data sectors are split by servo sectors. If the disk drive has multiple heads, then the set of tracks which are at the same radius on all surfaces is referred to as a "cylinder".

Read/write electronic 313 receives signals 338 from transducer 308, passes servo information 366 to servo electronics 312, and passes data signals 368 to formatter 315. Servo electronics 312 uses the servo information to produce a current at 340 which controls the voice coil motor 310 to properly position the transducer 308. Interface electronics 314 communicates with a host system (not shown) over interface 362, passing data and command information. Interface electronics 314 also communicates with formatter 315 over interface 364. Microprocessor 316 communicates with the various other electronics over command and data bus 370.

In the operation of disk drive 302, interface electronics 314 receives a request for reading or writing data sectors over interface 362. Formatter electronics 315 receives a list of requested data sectors from interface electronics 314 and converts them into zone, cylinder, head and data sector numbers which uniquely identify the location of the desired data sector. The head and cylinder information 360 are passed to servo electronics 312, which is responsible for positioning recording head 308 over the appropriate data sector on the appropriate cylinder. If the cylinder number provided to servo electronics 312 is not the same as the track number over which recording head 308 is presently positioned, a seek operation is performed to reposition recording head 308 over the appropriate cylinder.

Once servo electronics 312 has positioned recording head 308 over the appropriate track, servo electronics 312 begins executing sector computations in order to locate and identify the desired data sector. As servo sectors 320 pass under recording head 308, the index mark 321 identifies the first servo sector, a wedge number locates and uniquely identifies subsequent servo sectors. In the format used in the present invention, the field holding the wedge number at a first wedge contains a head number in the next servo sector. The head number and the wedge number are alternated. A count of wedge numbers/head number field can also be used to identify each servo sector. Additional information, which is described in greater detail below, is maintained in association with servo electronics 312 and formatter electronics 315 and is used to determine whether the present servo sector splits a data sector or whether a new data sector starts immediately following the present servo sector. Further information is maintained in servo electronics 312 and formatter electronics 315 which identifies the location of (or the distance to) the start of the next data sector from the present servo sector. Still further information is maintained which identifies the location of (or the distance to) any additional data sectors which begin before the next subsequent servo sector. Still further information identifies the number of the data sectors from the index mark 321. Other information determines the locations of the track and track offsets in the case of a bad or defective track. This information is used to allow formatter electronics 315 to compare the data sector number passing under the recording head with the list of sectors received from interface electronics 314.

As mentioned above, external controllers use a 512 byte sector size on the backing storage disks. However, manufacturers are moving to larger sector sizes to accommodate first sector and system drive information and later full LRC information. A problem with migrating a system drive that fully utilizes the available space on the drives upon which it is built is that there is no room to allow for a larger sector size. To allow the migration to take place a number of new drives must be added to the system drive to accommodate the additional data which will be stored. According to the present invention, data stored in a first (e.g., 512) byte sector format is moved to a second (e.g., 52x) byte sector size. Data migration is performed without interruption of the host's ability to write and read data from the system by migrating data to a number of new drives added to the system drive, the additional data which will be stored may be accommodated. The added drives allow the migration to take place without interruption of the hosts I/O path or allows the data to be migrated to an entirely new set of physical drives.

FIG. 4 illustrates a flow chart 400 of a general embodiment of the invention for migrating data from a first format type to a second format type. FIG. 4 shows that at least one drive is added to the system 410. Then, the data in a first format type on the original drives is converted to a format of second type on the added at least one drive 420. Where the number of available new drives is limited either for cost reasons or simply a lack of physical enclosure slots, an additional physical drive is installed to accommodate the newly added data as described below in more detail with reference to the flow chart 500 of FIG. 5. If there are sufficient drives available to create a "mirror" of the system drive which needs to be migrated, a complete mirror system may be used as described below in more detail with reference to the flow chart 600 of FIG. 6.

Figure 5:
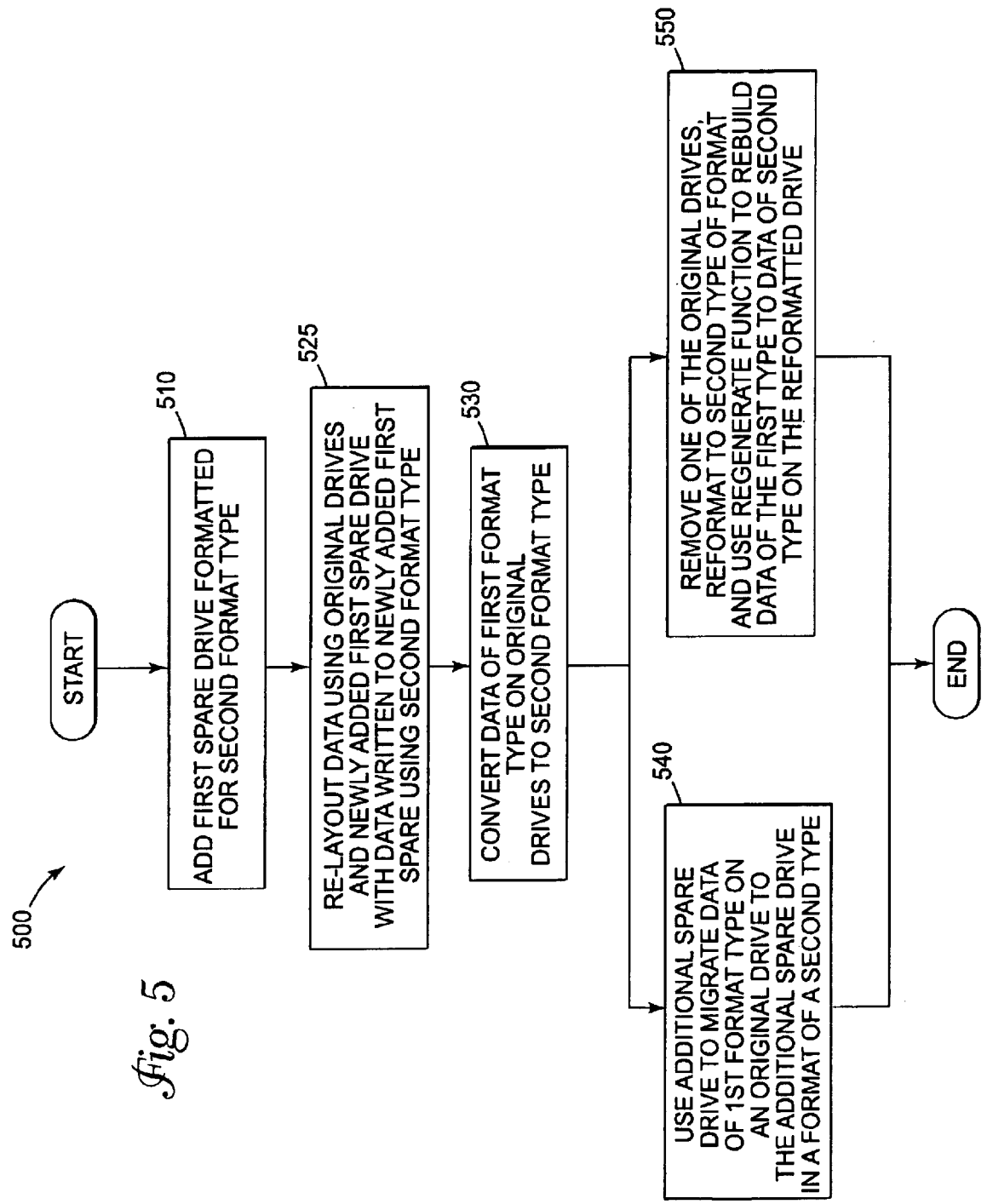
FIG. 5 illustrates a flow chart where an additional physical drive is added to accommodate the newly added data.

In FIG. 5, if an initial configuration uses four physical drives to create a system drive and the data is laid out in 512 byte sectors, an additional physical drive is added to accommodate the new added data 510. The newly added drive is formatted for 52x sector size. The data is then re-laid (i.e., rearrangement of data within and between drives with no substantive changes to the data) out to utilize five physical drives instead of four 525. The data that is written to the newly added drive will use a 52x sector size, while all of the original drives will retain the 512 byte sector size.

After the data migration has completed, it is now time to convert the original drives to a 52x sector format 530. The conversion process 530 may be performed according to one of two methods 535; through the use of an additional spare drive which is used to migrate 512 byte sector information to 52x byte sector information 540 or through the use of the regenerate( ) function which will allow the 512 byte information to be rebuilt onto the 52x format 550.

In the first conversion process 540, a "spare" drive is formatted to use 52x size sectors. A background process then works on moving all of the data from the old 512 byte sector drive onto the new 52x drive. All host writes which take place are written to both drives until the migration is completed. This allows for either the new 52x drive or the old 512 drive to fail without risking any data in the system. If the 512 drive dies the migration can then take place using the regenerate( ) function. This technique is required for non-protected RAID groups (i.e. RAID 0). They cannot tolerate any failures of a "real" data drive while the migration is taking place.

The second conversion process 550 uses the regenerates function is only valid for RAID groups which have built in redundancy. The process here involves removing a 512 drive, reformatting it to 52x sector size. The migration then starts using the regenerateO function to rebuild the data onto the newly formatted drive. This technique involves large periods of time in which the data is not protected from a disk failure. Nevertheless, both conversion processes 540, 550 require performing the migration for all physical drives which need to be reformatted to the new sector size.

FIG. 6 illustrates the preferred embodiment of the present invention for migrating data from a first format type to a second format type. The preferred embodiment assumes that there are sufficient drives available to create a "mirror" of the system drive which needs to be migrated 610. The "mirror" drive will likely contain more physical drives than the original system drive to accommodate the new sector size. All of the new drives are formatted using the second (e.g., 52x) sector size 620. Next, a copy operation is initiated to move all of the data from the original system drive onto the new "mirror" drive 630 using the second format type. The data will likely need to be re-laid out to account for the additional physical drives. While the copy operation is being performed, any new host writes will be written to both the original and the "mirror" system drives. Once the copy operation has completed, the original system drive will be replaced by the new "mirror" system drive. At this point the original drives can be reused to perform another migration.

This technique has the advantage of speed and resiliency to drive failures. Not only is each system drive protected by the potential RAID level, at no time during the migration is the integrity of the original system drive compromised by the migration. For these reasons this is the preferred embodiment of the present invention. It is only limited by the need for additional drives which may not be available due to system configuration limitations or cost constraints.

Accordingly, the present invention provides the ability to take a system which uses one sector size and move to using another sector size. The present invention also provides the ability to migrate data between sector sizes and still protect against component failures. The migration is performed in such a way that if a controller fails while performing the migration the survivor controller will be able to pick up where the failed controller left off. This is done through checkpoints in the migration process and saving information to a non-volatile memory which allows for resumption of the migration process.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for migrating data having a first format type to a second format type, comprising:
    adding at least one drive having a format of a second type to a system controller controlling a predetermined number of storage devices having a format of a first type arranged in a digital array of storage devices to form a system drive; and
    converting data from a storage device having the first format type on the digital array of storage devices to a format of a second type and migrating the converted data in the format of the second type onto the added at least one drive having a format of the second type.

2. The method of claim 1 wherein the adding at least one drive further comprises:
    formatting a first drive in the second format type; and
    adding the first drive formatted in the second format type to the system drive of the system controller.

3. The method of claim 2 wherein the converting further comprises:
    re-laying out data stored on the predetermined number of storage devices arranged in the digital array storage devices forming the system drive using the predetermined number of storage devices and the added first drive formatted in the second format type;
    adding second drive formatted in the second format type to the system controller; and
    migrating data of first format type from one of the predetermined number of storage devices to the added second drive in the second format type.

4. The method of claim 3 wherein the migrating is performed by the system controller using a background process.

5. The method of claim 4 wherein the system controller performs data writes to both the one of the predetermined number of storage devices and the added second drive during the migration performed by the background process.

6. The method of claim 3 wherein the one of the predetermined number of storage devices is removed after the migration is completed, an additional drive formatted in the second format type is added in its place and data of the first format type from another of the predetermined number of storage devices is migrated to the additional drive in the second format type.

7. The method of claim 3 wherein the migrating is performed by the system controller using a regeneration function when the one of the predetermined number of storage devices fails before the migration has completed.

8. The method of claim 2 wherein the converting further comprises:
   re-laying out data stored on the predetermined number of storage devices arranged in the digital array of storage devices forming the system drive using the predetermined number of storage devices and the added first drive formatted in the second format type;
   removing one of the predetermined number of storage devices arranged in the digital array of storage devices forming the system drive;
   reformatting the removed storage device to the second format type;
   reinstalling the reformatted storage device; and
   rebuilding data in the first format type onto the reinstalled storage device in the second format type using a regeneration function.

9. The method of claim 1 wherein the adding at least one drive to a system controller further comprises:
   selecting drives to create a mirror system drive; and
   formatting the mirror system drive using the second format type.

10. The method of claim 9 wherein the converting data further comprises copying data from the predetermined number of storage devices arranged in the digital array storage devices in the first format type to the mirror system drive in the second format type.

11. The method of claim 10 wherein the system controller performs data writes to both the system drive and the mirror system drive during the copying of the data to the mirror system drive.

12. The method of claim 11 wherein the system drive is removed after completion of the copying process.

13. The method of claim 11 wherein the first format type is 512 bytes per sector and the second format type consists of one selected from the group comprising 520 bytes per sector, 524 bytes per sector and 528 bytes per sector.

14. A storage system, comprising:
   a plurality of storage devices forming a system drive, the plurality of storage devices formatted in a first format type;
   a system controller, coupled to the plurality of storage devices, for controlling the plurality of storage devices forming the system drive; and
   at least one drive formatted in a second format type added to the system drive, coupled to the system controller, wherein the system controller converts data from a storage device having the first format type on the plurality of storage devices to a format of a second type, the converted data formatted in the second type being migrated onto the at least one drive formatted in a second format type added to the system drive.

15. The storage system of claim 14 wherein the system controller converts data in a first format type on the plurality of storage devices to a format of a second type on the first drive formatted in the second format type by re-laying out data stored on the plurality of storage devices and the added first drive formatted in the second format type, adding a second drive formatted in the second format type to the system controller; and migrating data of first format type from one of the plurality of storage devices to the added second drive in the second format type.

16. The storage system of claim 15 wherein the migrating is performed by the system controller using a background process.

17. The storage system of claim 16 wherein the system controller performs data writes to both the one of the plurality of storage devices and the added second drive during the migration performed by the background process.

18. The storage system of claim 15 wherein the one of the plurality of storage devices is removed after the migration is completed, an additional drive formatted in the second format type is added in its place and data of the first format type from another of the plurality of storage devices is migrated to the additional drive in the second format type.

19. The storage system of claim 14 wherein the migrating is performed by the system controller using a regeneration function when the one of plurality of storage devices fails before the migration has completed.

20. The storage system of claim 14 wherein the system controller converts data in a first format type on the plurality of storage devices to a format of a second type on the first drive formatted in the second format type by re-laying out data stored on the predetermined number of storage devices arranged in the digital array of storage devices forming the system drive using the predetermined number of storage devices and the added first drive formatted in the second format type, removing one of the predetermined number of storage devices arranged in the digital array of storage devices forming the system drive, reformatting the removed storage device to the second format type, reinstalling the reformatted storage device and rebuilding data in the first format type onto the reinstalled storage device in the second format type using a regeneration function.

21. The storage system of claim 14 wherein the at least one drive further comprises a plurality of additional storage devices arranged to form a mirror system drive, wherein the plurality of additional storage devices arranged to form the mirror system drive are formatted using the second format type.

22. The storage system of claim 21 wherein the system controller converts data by copying data from the plurality of storage devices in the first format type to the mirror system drive formatted in the second format type.

23. The storage system of claim 22 wherein the system controller performs data writes to both the system drive and the mirror system drive during the copying of the data to the mirror system drive.

24. The storage system of claim 23 wherein the plurality of storage devices forming the system drive are removed after completion of the copying process to the mirror drive.

25. The storage system of claim 14 wherein the first format type is 512 bytes per sector and the second format type consists of one selected from the group comprising 520 bytes per sector, 524 bytes per sector and 528 bytes per sector.

* * * * *

UNITED STATES PATENT AND TRADEMARK OFFICE
CERTIFICATE OF CORRECTION

PATENT NO. : 6,950,900 B1
DATED : September 27, 2005
INVENTOR(S) : McKean et al.

It is certified that error appears in the above-identified patent and that said Letters Patent is hereby corrected as shown below:

Column 5,
Line 43, "datarom"; should read -- data from --.

Signed and Sealed this

Twentieth Day of December, 2005

JON W. DUDAS
*Director of the United States Patent and Trademark Office*